(12) United States Patent
Gill

(10) Patent No.: US 6,650,509 B2
(45) Date of Patent: Nov. 18, 2003

(54) DUAL SPIN VALVE SENSOR WITH AP PINNED LAYERS

(75) Inventor: Hardayal Singh Gill, Palo Alto, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 271 days.

(21) Appl. No.: 09/813,609

(22) Filed: Mar. 20, 2001

(65) Prior Publication Data

US 2002/0159199 A1 Oct. 31, 2002

(51) Int. Cl.[7] .............. G11B 5/127; G11B 5/33; G11B 5/39
(52) U.S. Cl. .............. 360/314; 360/324.11; 360/324.12
(58) Field of Search ................ 360/324.11, 324.12, 360/313, 317, 324, 324.1, 110, 314

(56) References Cited

U.S. PATENT DOCUMENTS

| | | | |
|---|---|---|---|
| 5,301,079 A | 4/1994 | Cain et al. | 360/324 |
| 5,442,508 A | 8/1995 | Smith | 360/314 |
| 5,583,725 A | 12/1996 | Coffey et al. | 360/324.11 |
| 5,627,703 A | 5/1997 | Smith | 360/314 |
| 5,677,625 A | 10/1997 | Dieny | 324/252 |
| 5,701,222 A | 12/1997 | Gill et al. | 360/314 |
| 5,705,973 A | 1/1998 | Yuan et al. | 338/32 R |
| 5,768,069 A | 6/1998 | Mauri | 360/314 |
| 5,825,595 A | 10/1998 | Gill | 360/314 |
| 5,880,913 A | 3/1999 | Gill | 360/324.11 |
| 5,920,446 A | 7/1999 | Gill | 360/324 |
| 6,175,476 B1 * | 1/2001 | Huai et al. | 360/324.11 |
| 6,317,297 B1 * | 11/2001 | Tong et al. | 360/314 |
| 6,449,134 B1 * | 9/2002 | Beach et al. | 360/324.12 |
| 2001/0009063 A1 * | 7/2001 | Saito et al. | 29/603.08 |

FOREIGN PATENT DOCUMENTS

| | | | |
|---|---|---|---|
| JP | 11103102 | | 4/1999 |
| JP | 11191207 | | 7/1999 |
| JP | 2000-349364 A | * | 12/2000 |

OTHER PUBLICATIONS

*IEEE Transactions on Magnetics*, 35/2, Mar. 1999 "Spin Valve and Dual Spin Valve Heads.."

* cited by examiner

Primary Examiner—Julie Anne Watko
(74) Attorney, Agent, or Firm—Ervin F. Johnston

(57) ABSTRACT

A dual antiparallel (AP) spin valve sensor has first, second, third and fourth AP pinned layers which are pinned by sense current fields from a sense current. First and second pinning layers are omitted so that the sensor stack has a reduced height for increasing the linear read bit density of a magnetic read head. Ferromagnetic coupling fields caused by second and third AP pinned layers next to a free layer structure are counterbalanced by a net demagnetizing field from the first and second AP pinned layer structures.

5 Claims, 7 Drawing Sheets

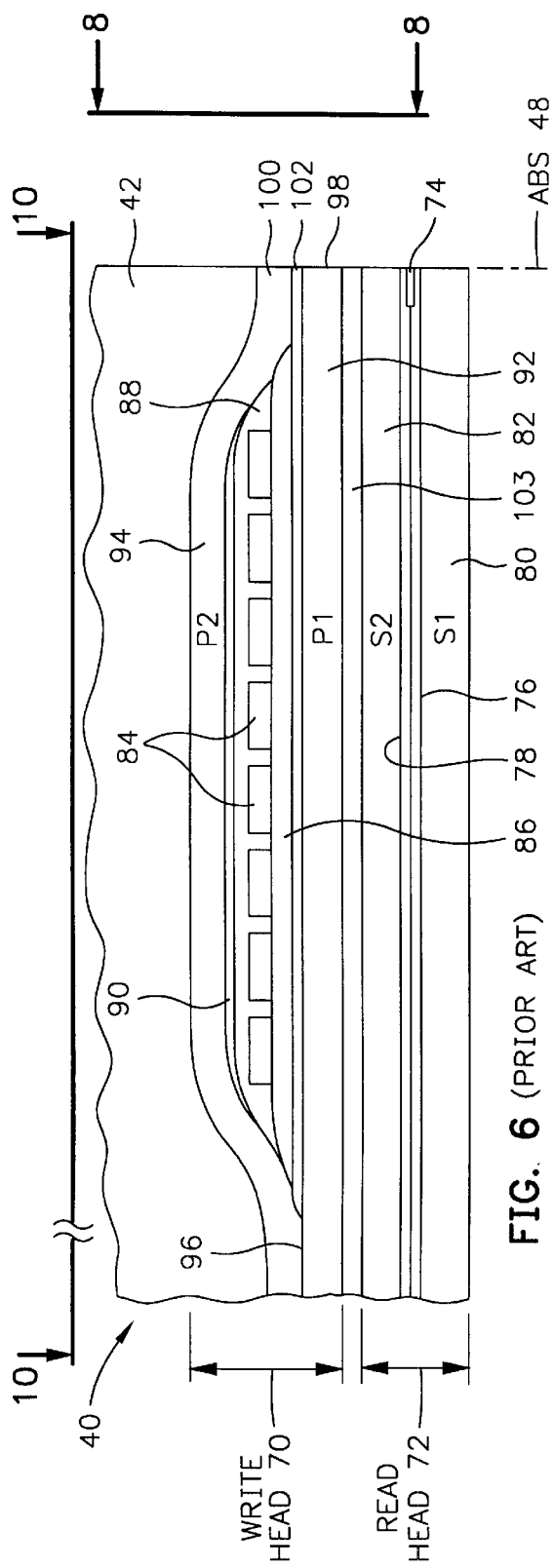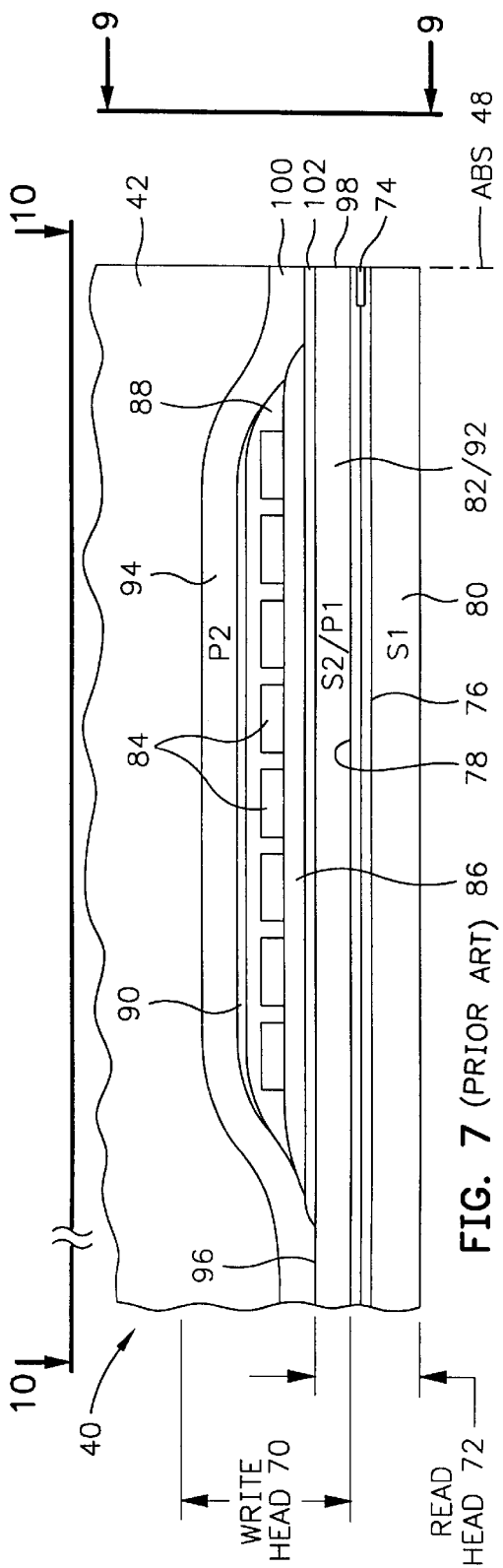
FIG. 6 (PRIOR ART)
FIG. 7 (PRIOR ART)

(ABS)

DUAL SPIN VALVE SENSOR WITH AP PINNED LAYERS

BACKGROUND OF THE INVENTION

1. Field of the Invention

The present invention relates to a dual spin valve sensor without antiferromagnetic (AFM) pinning and, more particularly, to such a sensor which has first and second antiparallel (AP) pinned layer structures on each side of a free layer structure with thicknesses that permit a sense current field to pin the magnetizations of the layers of the AP pinned layer structures so that the layers next to the free layer structure are pinned parallel with respect to one another.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry, which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor are a function of cos θ, where θ is the angle between the magnetic moments of the pinned and free layers. When a sense current is conducted through the spin valve sensor, resistance changes cause potential changes that are detected and processed as playback signals from the rotating magnetic disk.

The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

The transfer curve for a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers. The strongest magnetic force on the free layer structure in a single spin valve sensor is the sense current field $H_I$. In an exemplary bottom spin valve sensor where the free layer is closer to the second gap layer than it is to the first gap layer the majority of the conductive layers are below the free layer structure between the free layer structure and the first gap layer. The amount of conductive material in this region is further increased if the pinning layer is metal, such as platinum manganese (PtMn), instead of an oxide, such as nickel oxide (NiO). When the sense current is conducted through the sensor the conductive layers below the free layer structure cause a sense current field on the free layer structure which is minimally counterbalanced by a typical cap layer made of tantalum (Ta) on top of the free layer structure. Further, the pinned layer structure below the free layer structure in a bottom spin valve sensor exerts a demagnetizing field on the free layer structure which needs to be counterbalanced to improve asymmetry of the spin valve sensor.

A dual spin valve sensor may be employed for increasing the magnetoresistive coefficient dr/R of a read head. In a dual spin valve sensor first and second pinned layers are employed with a first spacer layer between the first pinned layer and the free layer and a second spacer layer located between the second pinned and the free layer. With this arrangement the spin valve effect is additive on each side of the free layer to increase the magnetoresistive coefficient dr/R of the read head. A distinct advantage of the dual spin valve sensor is that the free layer structure is in the middle of the sensor so that sense current fields from the pinned layer structures and other conductive layers on each side of the free layer structure counterbalance each other. Accordingly, the net sense current field acting on the free layer structure can be made to be zero or nearly zero. A disadvantage of the dual spin valve sensor, as compared to the single spin valve sensor, is that it is significantly thicker than the single spin valve sensor which means that it has a larger read gap as measured between the first and second shield layers. The larger read gap equates to a reduced read bit density of the read head. In a dual spin valve sensor a first pinning layer pins the magnetic moment of the first pinned layer structure and a second pinning layer pins the magnetic moment of the second pinned layer structure. Each of the pinned layers is required to have at least a thickness of 125 Å in order to implement the required pinning of the pinned layer structures. Accordingly, each pinning layer has a thickness which is greater than the combined thicknesses of all of the layers of the dual spin valve sensor. This means that less data can be stored on a rotating magnetic disk which results in less storage capacity of the computer. Accordingly, there is a strong-felt need to obtain the increased magnetoresistive coefficient dr/R of a dual spin valve sensor without sacrificing linear bit density of the read head.

SUMMARY OF THE INVENTION

The present invention provides a dual spin valve sensor with a significantly decreased sensor stack as compared to prior art dual spin valve sensors. The present dual spin valve sensor omits the prior art first and second pinning layers so as to reduce the overall sensor stack height by at least 250 Å. This is accomplished by providing the dual spin valve sensor with uniquely configured first and second antiparallel (AP) pinned layer structures wherein a first AP pinned layer structure is located between the first gap layer and the free layer structure and the second AP pinned layer structure is located between the second gap layer and the free layer structure. For sake of clarity, the first AP pinned layer structure will be described as having an antiparallel (AP) coupling layer located between ferromagnetic first and second AP pinned layers and the second AP pinned layer structure will be described as having an AP coupling layer located between ferromagnetic third and fourth AP coupling layers. During fabrication of such a sensor the first AP coupling layer will be formed after formation of the first gap layer followed by the second, third and fourth AP coupling layers. In the present dual spin valve sensor the magnetic moments of the first, second, third and fourth AP pinned layers are pinned by a sense current field from the sense current $I_S$. It is important that this pinning action pin the magnetic moments of the second and third AP pinned layers parallel with respect to one another so that they are in-phase with respect to one another. When they are in-phase the spin valve effects on each side of the free layer structure will be additive. This is accomplished by making the first and third AP pinned layer structures thinner or thicker than the second and fourth AP pinned layer structures respectively. When the thicknesses of the AP pinned layers are fashioned according to the present invention, the dual spin valve sensor is insensitive to the direction of the sense current. Accordingly, for either direction of the sense field through the spin valve sensor the second and third AP pinned layers next to the free layer structure will be in-phase. However, after selecting a particular direction for the sense current an aspect of the present invention is to fabricate the AP pinned layers with their magnetizations oriented in the same direction as the fields which pin their directions when the sense current $I_S$ is conducted through the dual spin valve sensor. Accordingly, during fabrication of the AP pinned layers, which is typically done by sputtering, a magnetic field is directed in the pinned direction of each AP pinned layer during the sputtering of the layer.

Since the sense current field of the spin valve sensor is substantially balanced, as discussed hereinabove, this leaves a ferromagnetic coupling field $H_{FC}$ which must be balanced in order to provide a zero bias point for the free layer structure. In a dual spin valve sensor there is a ferromagnetic coupling field on each side of the free layer structure due to the AP pinned layer which is next to each side of the free layer structure. Each of the ferromagnetic coupling fields is typically positive which means its direction is parallel to the direction of the magnetization of the respective AP pinned layer. This means that the ferromagnetic coupling fields are additive into the sensor or out of the sensor, depending upon the directions of the magnetizations of the respective AP pinned layers. The net ferromagnetic coupling field, which is a summation of the two ferromagnetic coupling fields on each side of the free layer structure, is counterbalanced in the present invention by a net demagnetization field from the first and second AP pinned layer structures. This is accomplished by making the net magnetic thickness of the first AP pinned layer structure either greater or less than the magnetic thickness of the second AP pinned layer structure.

Another distinct advantage of the present dual spin valve sensor is that the magnitude of the sense current $I_S$ is not restricted by the blocking temperatures of the first and second pinning layers employed in the prior art dual spin valve sensor. If the sense current $I_S$ was too high in the prior art dual spin valve sensor the temperature of the sensor can be raised to or near to the blocking temperature of either of the pinning layers which causes the pinning layer to lose its exchange coupling with the adjacent pinned layer structure. When the pinned layer structure loses its pinning from the pinning layer the magnetic moment of the pinned layer structure is free to move in various directions which renders the read head unstable and incapable of performing the reading function. With the present dual spin valve sensor the sense current $I_S$ can be elevated which equates to an increase in the output signal of the dual spin valve sensor. The stripe height of the sensor, which is the distance between the ABS and the recessed end of the sensor in the head, is also not restricted by the blocking temperatures. While a decrease in the stripe height increases heat within the spin valve sensor, it also increases the sense current field $H_I$ which is desirable for implementing a strong pinning action of the AP pinned layer structures. Another distinct advantage of the present dual spin valve sensor is that the absence of the first and second pinning layers, which are typically conductive, increases the sheet resistance of the sensor stack. Accordingly, the sense current is not shunted through the pinning layers which results in a higher magnetoresistive coefficient dr/R.

An object of the present invention is to provide a dual spin valve sensor which has an improved linear read bit density.

Another object is to provide the aforementioned spin valve sensor with net ferromagnetic coupling and demagnetization fields which counterbalance each other.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
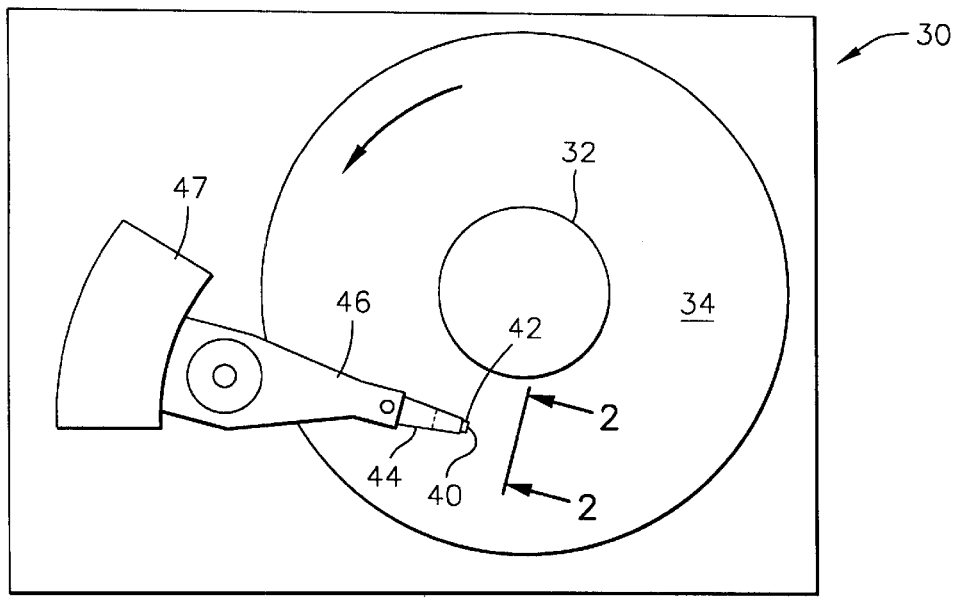
FIG. 1 is a plan view of an exemplary magnetic disk drive.
Figure 2:
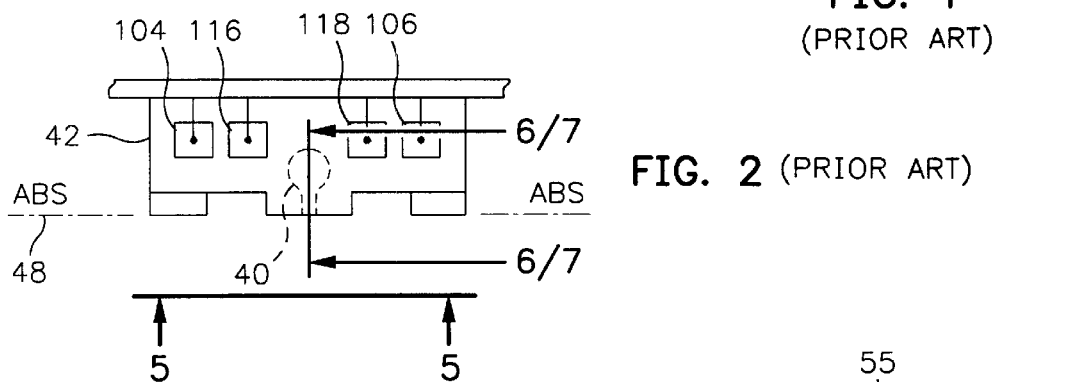
FIG. 2 is an end view of a slider with a magnetic head of the disk drive as seen in plane 2—2 of FIG. 1.
Figure 3:
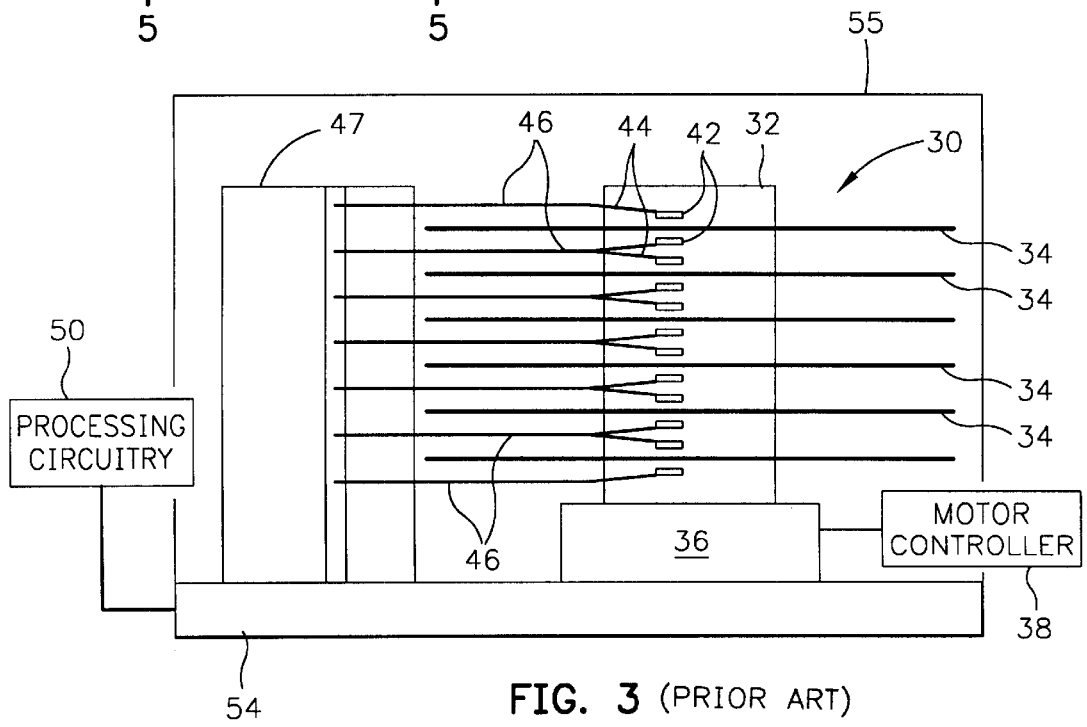
FIG. 3 is an elevation view of the magnetic disk drive wherein multiple disks and magnetic heads are employed.
Figure 4:
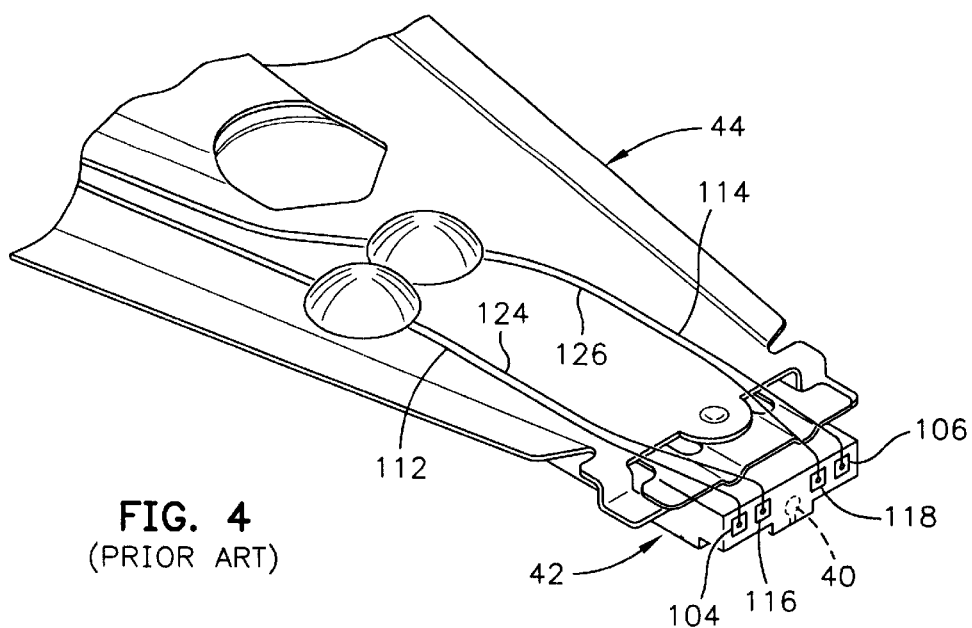
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
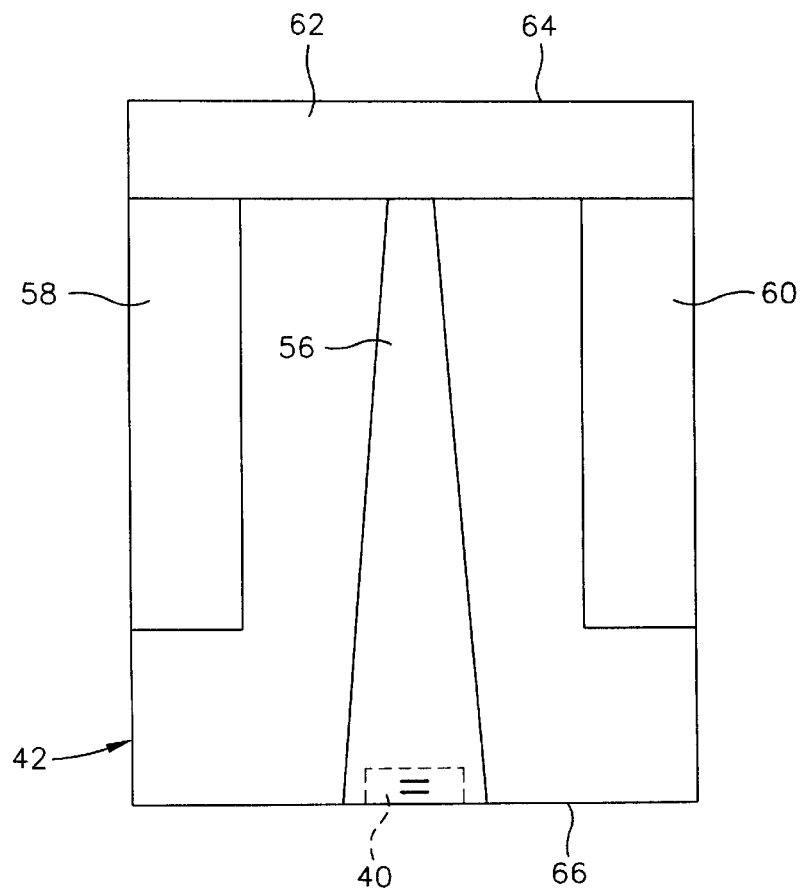
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
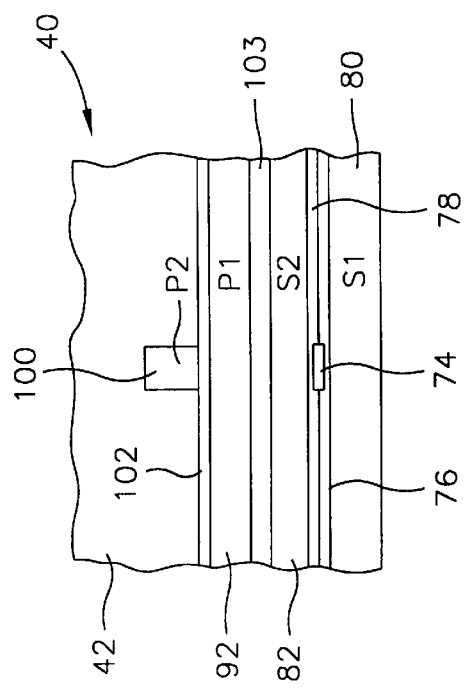
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
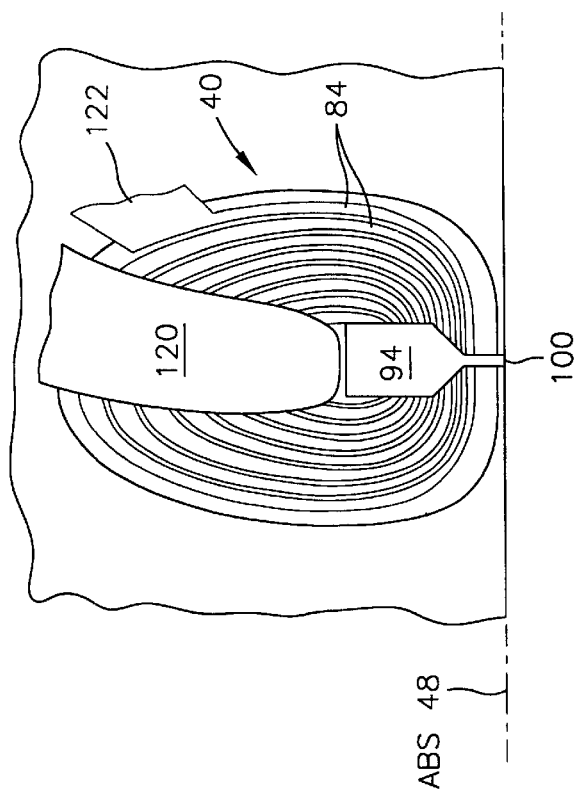
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
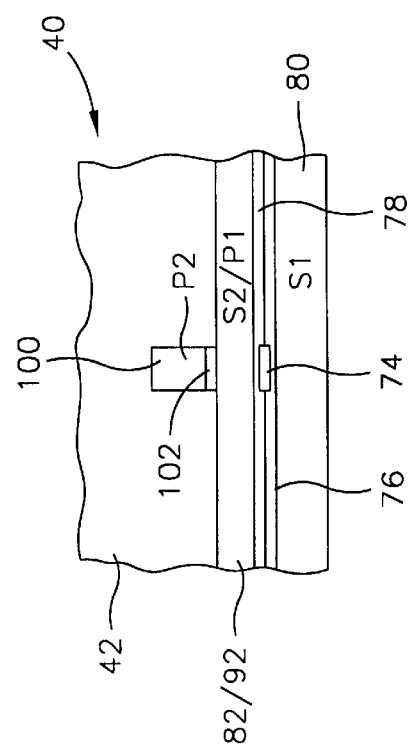
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
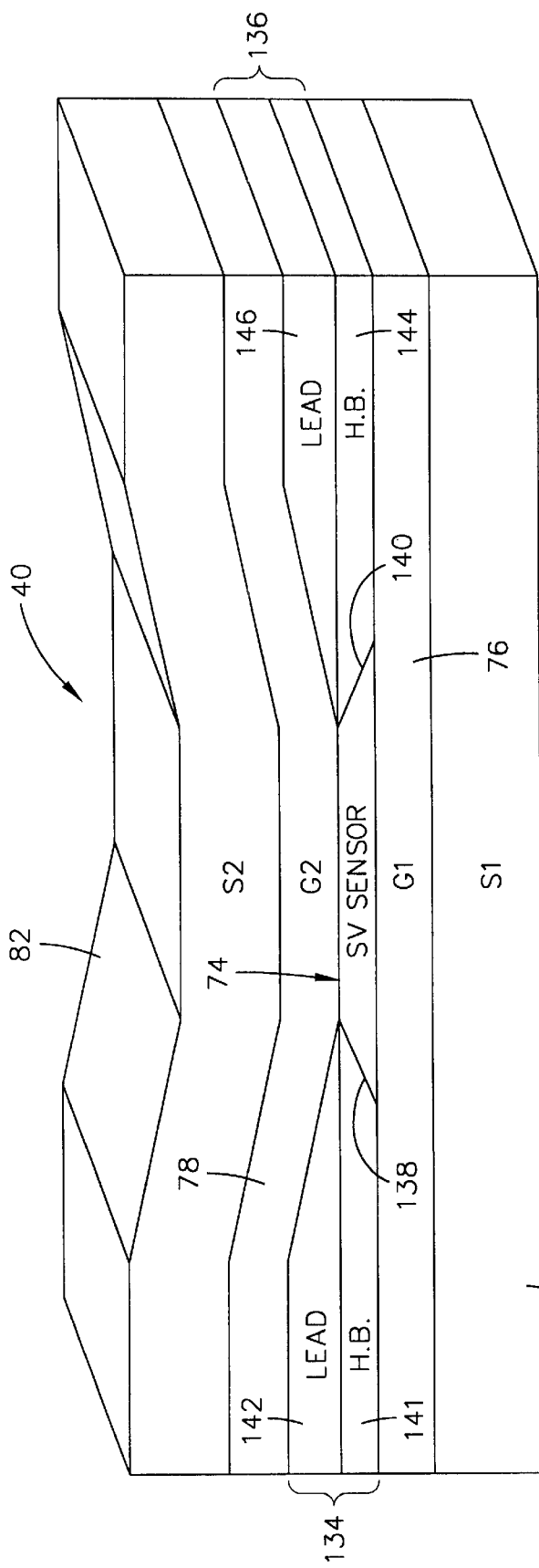
FIG. 11 is an enlarged isometric illustration of a read head which has the present dual spin valve sensor.

FIG. 11 is an isometric ABS illustration of the read head 72 shown in FIG. 6 or 8. The read head 72 includes the present dual spin valve sensor 74. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 141 and a first lead layer 142 and the second hard bias and lead layers 136 include a second hard bias layer 144 and a second lead layer 146. The hard bias layers 141 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

Figure 12:
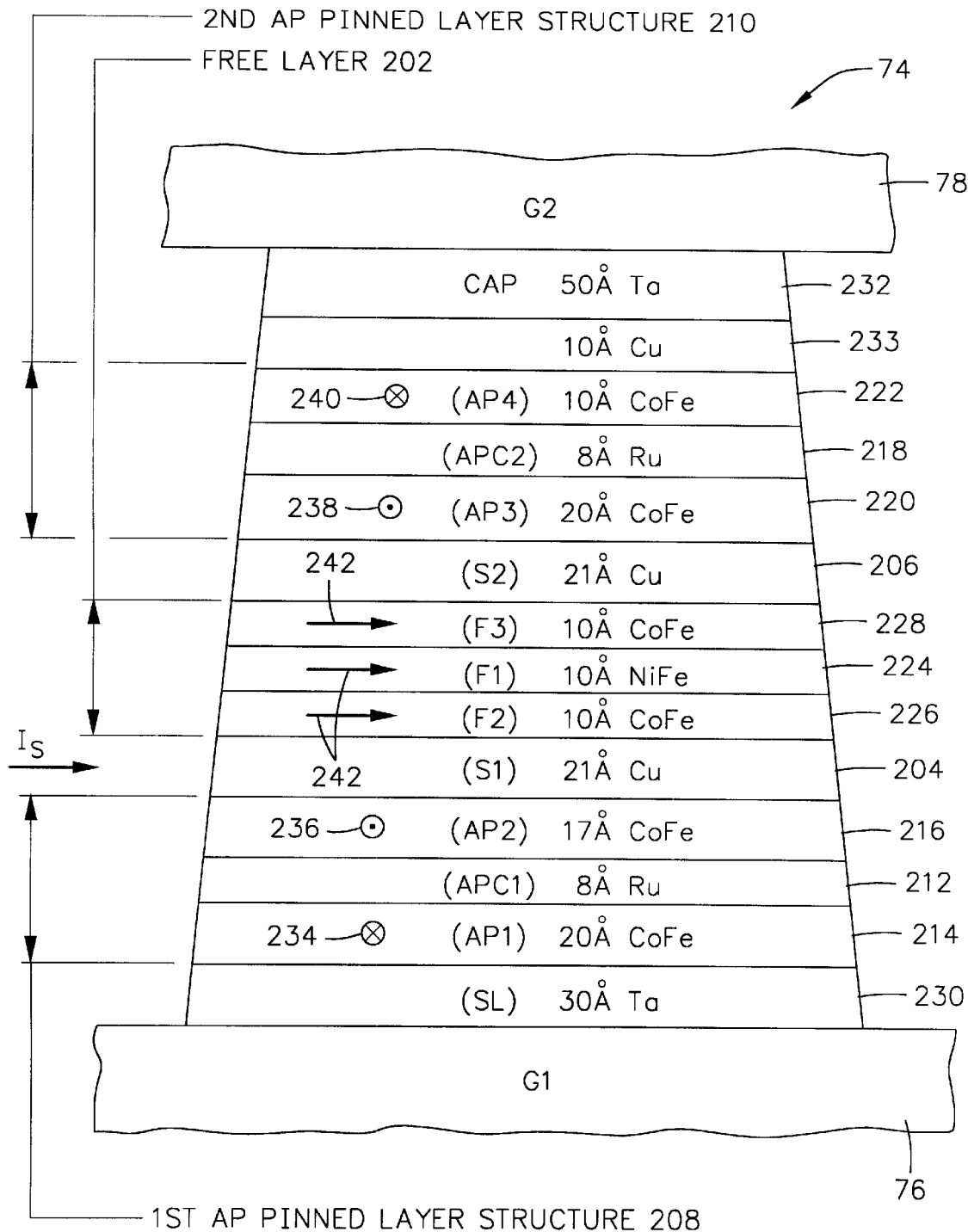
FIG. 12 is an ABS illustration of the present dual spin valve sensor.

FIG. 12 is an ABS illustration of the present dual AP pinned spin valve sensor 74 which is located between the first and second read gap layers 76 and 78. In this sensor a free layer 202 is located between nonmagnetic conductive first and second spacer layers (S1) and (S2) 204 and 206. The first and second spacer layers 204 and 206 are, in turn, located between first and second AP pinned layer structures 208 and 210. The first AP pinned layer structure 208 includes a first antiparallel coupling (APC1) layer 212 which is located between ferromagnetic first and second AP pinned layers (AP1) and (AP2) 214 and 216. The second AP pinned layer structure 210 includes a second antiparallel coupling (APC2) layer 218 which is located between ferromagnetic third and fourth AP layers (AP3) and (AP4) 220 and 222.

The free layer 202 may include a first free film (F1) 224 of nickel iron (NiFe) which is located between second and third free films (F2) and (F3) 226 and 228 of cobalt iron (CoFe). It has been found that the cobalt iron (CoFe) free films next to the copper (Cu) spacer layers 204 and 206 increase the magnetoresistive coefficient dr/R of the sensor. A seed layer (SL) 230 may be located between the first read gap layer 76 and the first AP pinned layer 214 for improving the texture of the layers deposited thereon and a cap layer 232 may be located between the fourth AP pinned layer 222 and the second read gap layer 78 for protecting the fourth AP pinned layer from subsequent processing steps. A copper layer 233 may be located between the layers 222 and 232 for increasing the magnetoresistive coefficient dr/R.

The present dual spin valve sensor 74 does not employ first and second pinning layers as required for prior art dual spin valve sensors. In the present dual AP pinned spin valve sensor the magnetic moments of the AP pinned layers 214, 216, 220 and 222 are pinned by sense current fields from the sense current $I_S$. It is important that the magnetic moments of the second and third AP pinned layers 216 and 220 be pinned parallel with respect to one another so that they are in-phase for combining the spin valve effects on each side of the free layer 202. This is accomplished by making the thicknesses of the first and third AP pinned layers 214 and 220 either magnetically thinner or magnetically thicker than the second and fourth AP pinned layers 216 and 222. In the embodiment shown in FIG. 12 the magnetic thickness of the first and third AP pinned layers 214 and 220 are thicker than the magnetic thicknesses of the second and fourth AP pinned layers 216 and 222 respectively. With the sense current $I_S$ directed from left to right, as shown in FIG. 12, the sense current fields from the conductive layers above the first AP pinned layer 214 will cause a magnetic moment 234 of the first AP pinned layer to be directed into the sensor, as shown in FIG. 12. By a strong antiparallel coupling between the first and second AP pinned layers 214 and 216 a magnetic moment 236 of the second AP pinned layer will be oriented antiparallel to the magnetic moment 234. The sense current $I_S$ causes sense current fields to be exerted on the third AP pinned layer 220 which, in turn, causes a magnetic moment 238 of the third AP pinned layer to be oriented out of the sensor, as shown in FIG. 12. By a strong antiparallel coupling between the third and fourth AP pinned layers 220 and 222 a magnetic moment 240 of the fourth AP pinned layer is oriented antiparallel to the magnetic moment 238. It can be seen from FIG. 12 that the magnetic moments 236 and 238 of the second and third AP pinned layers are parallel with respect to one another so that they are in-phase.

The free layer 202 has a magnetic moment 242 which is oriented from right to left or from left to right, as shown in FIG. 12. When a signal field from a rotating magnetic disk adjacent the ABS of the read head rotates the magnetic moment 242 into the head the magnetic moment 242 becomes more antiparallel with respect to each of the magnetic moments 236 and 238. This increases the resistance of the sensor to the sense current $I_S$. When a signal field from the rotating magnetic disk rotates the magnetic moment 242 of the free layer out of the head the magnetic moment 242 becomes more parallel with respect to each of the magnetic moments 236 and 238 which decreases the resistance of the spin valve sensor to the sense current $I_S$. These increases and decreases in resistance of the spin valve sensor are processed as playback signals by the processing circuitry 50 in FIG. 3.

Exemplary thicknesses of the layers are 30 Å of tantalum for the seed layer 230, 20 Å of cobalt iron for the first AP pinned layer 214, 8 Å of ruthenium for the first antiparallel coupling layer 212, 17 Å of cobalt iron for the second AP pinned layer 216, 21 Å of copper for the first spacer layer 204, 10 Å of cobalt iron for the second free layer 226, 10 Å of nickel iron for the first free layer 224, 10 Å of cobalt iron for the third free layer 228, 21 Å of copper for the second spacer layer 206, 20 Å of cobalt iron for the third AP pinned layer 220, 8 Å of ruthenium for the second antiparallel coupling layer 218, 10 Å of cobalt iron for the fourth AP pinned layer 222, 10 Å of copper for the layer 233 and 50 Å of tantalum for the cap layer 232.

Another aspect of the invention is to counterbalance the ferromagnetic coupling field exerted on the free layer structure 202 by each of the second and third AP pinned layers 216 and 220.

Figure 13:
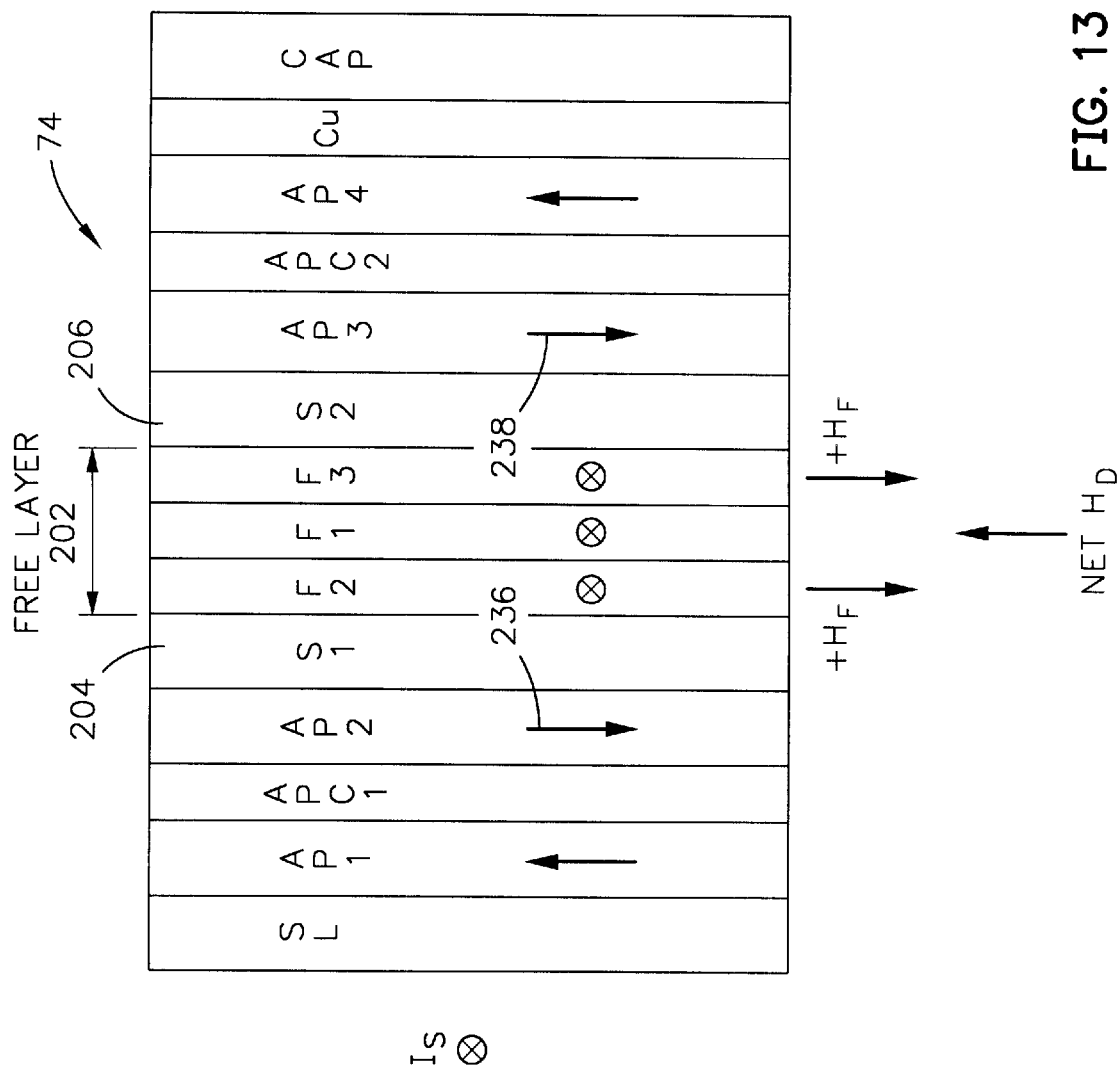
FIG. 13 is a view from the left end of FIG. 12 rotated 90° clockwise.

As shown in FIG. 13 each of the magnetic moments 236 and 238 of the second and third AP pinned layers 216 and 220 cause positive ferromagnetic coupling fields $H_F$ to be directed downwardly. An aspect of the present invention is to counterbalance these ferromagnetic coupling fields $H_F$ with a net demagnetizing field $H_D$ from the first and second AP pinned layers 208 and 210. With the aforementioned thicknesses described hereinabove for the AP pinned layers there will be a net demag field $H_D$, as shown in FIG. 13, which opposes and counterbalances the ferromagnetic coupling fields $+H_F$. This can be seen from FIG. 12 wherein the first and third AP pinned layers 214 and 220 have the same thickness and the second and fourth AP pinned layers 216 and 222 have different thicknesses wherein the second AP pinned layer 216 has 7 Å more cobalt iron thickness than the fourth AP pinned layer 222. Accordingly, the net demagnetizing field $H_D$ in FIG. 13 is equivalent to a demagnetizing field caused by the extra 7 Å of cobalt iron in the second AP pinned layer 216. It should be understood that any combination of thicknesses wherein the net demagnetizing field opposes the ferromagnetic coupling fields $H_F$ is within the spirit of the invention. For instance, the second and fourth AP pinned layers may have an equal thickness and the first and third AP pinned layers may have a differential thickness which causes the net demagnetization field $H_D$. Further, it should be understood that the thicknesses of the AP pinned layers are to be determined by their magnetic thickness rather than their actual thickness. For instance, if the AP pinned layers are fabricated of different ferromagnetic materials the magnetic thicknesses of these materials are to be calculated in determining the appropriate thickness relationships as described hereinabove.

Discussion

It should be noted that the sensor in FIG. 12 is insensitive to the direction of the sense current $I_S$. If the sense current $I_S$ in FIG. 12 is reversed so that it is directed from right to left instead of from left to right the magnetic moments 234, 236, 238 and 240 are simply reversed in their directions without any change in the functioning of the spin valve sensor. It should be further noted that if the thicknesses of the second and fourth AP pinned layers 216 and 222 are greater than the thicknesses of the first and third AP pinned layers 214 and 220 respectively the result is still within the scope of the invention. Whatever arrangement is selected, another aspect of the invention is that the easy axes of the AP pinned layers 214, 216, 220 and 222 be oriented parallel to the magnetizations 234, 236, 238 and 240 respectively caused by the sense current fields from the sense current $I_S$. For example, in the embodiment shown in FIG. 12 the easy axis of the first AP pinned layer 214 would be oriented into the head parallel to the magnetic moment 234, the easy axis of the second AP pinned layer 216 would be oriented out of the head parallel to the magnetic moment 236, the easy axis of the third AP pinned layer 220 would be oriented out of the head parallel to the magnetic moment 238 and the easy axis of the fourth AP pinned layer 222 would be oriented into the head parallel to the magnetic moment 240. The easy axes are oriented in appropriate directions during the fabrication of the head. For instance, when the first AP pinned layer is sputter deposited a magnetic moment is present in the sputtering chamber which is parallel to the magnetic moment 234, when the second AP pinned layer 242 is sputter deposited the magnetic field is oriented parallel to the magnetic moment 236, when the third AP pinned layer 222 is sputter deposited the magnetic field is oriented parallel to the magnetic moment 238 and when the fourth AP pinned layer 222 is sputter deposited the magnetic field is oriented parallel to the magnetic moment 240. During construction of the free layers 226, 224 and 228 the magnetic field is oriented parallel to the magnetic moment 242. As stated above, however, this magnetic moment may be reversed without altering the scope of the invention. It should further be understood that other ferromagnetic materials may be substituted for cobalt iron such as cobalt or nickel iron. Further, a net sense current field $H_I$ may be employed for counterbalancing the ferromagnetic coupling fields $H_F$, in FIG. 13, by providing an excess of conductive material on one side or the other of the free layer structure 202. This may be accomplished with a differential conductive thickness between the seed layer 230 and the copper layer 233.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:
1. A magnetic read head which has an air bearing (ABS) surface comprising:
   nonmagnetic electrically nonconductive first and second read gap layers;
   a spin valve sensor being located between the first and second read gap layers;
   ferromagnetic first and second shield layers; and
   the first and second read gap layers being located between the first and second shield layers;
   the spin valve sensor including:
      a ferromagnetic free layer structure;
      first and second antiparallel (AP) pinned layer structures;
      the first AP pinned layer structure having a first antiparallel (AP) coupling layer located between ferromagnetic first and second antiparallel (AP) pinned layers and the second AP pinned layer structure having a second antiparallel (AP) coupling layer located between ferromagnetic third and fourth antiparallel (AP) pinned layers;
      the second and third AP pinned layers having magnetic moments that are perpendicular to the ABS and parallel with respect to one another;
      a nonmagnetic electrically conductive first spacer layer located between the free layer structure and the second AP pinned layer and interfacing the second AP pinned layer;
      a nonmagnetic electrically conductive second spacer layer located between the free layer structure and the third AP pinned layer and interfacing the third AP pinned layer;
      the first and third AP pinned layers having magnetic thicknesses that are greater or less than magnetic thicknesses of the second and fourth AP pinned layers respectively;
      each of the second and third AP pinned layers exerting a ferromagnetic coupling field on the free layer structure; and
      the first and second AP pinned layer structures having a net demagnetizing field that counterbalances the ferromagnetic coupling fields on the free layer structure.

2. A magnetic head assembly having an air bearing surface (ABS), comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      a spin valve sensor;
      nonmagnetic electrically nonconductive first and second read gap layers;
      the spin valve sensor being located between the first and second read gap layers;

a ferromagnetic first shield layer; and
the first and second gap layers being located between the first shield layer and the first pole piece layer; and
the spin valve sensor including:
a ferromagnetic free layer structure;
first and second antiparallel (AP) pinned layer structures;
the first AP pinned layer structure having a first antiparallel (AP) coupling layer located between ferromagnetic first and second antiparallel (AP) pinned layers and the second AP pinned layer structure having a second antiparallel (AP) coupling layer located between ferromagnetic third and fourth antiparallel (AP) pinned layers;
the second and third AP pinned layers having magnetic moments that are perpendicular to the ABS and parallel with respect to one another;
a nonmagnetic electrically conductive first spacer layer located between the free layer structure and the second AP pinned layer and interfacing the second AP pinned layer;
a nonmagnetic electrically conductive second spacer layer located between the free layer structure and the third AP pinned layer and interfacing the third AP pinned layer; and
the first and third AP pinned layers having magnetic thicknesses that are greater or less than magnetic thicknesses of the second and fourth AP pinned layers respectively;
each of the second and third AP pinned layers exerting a ferromagnetic coupling field on the free layer structure; and
the first and second AP pinned layer structures having a net demagnetizing field that counterbalances the ferromagnetic coupling fields on the free layer structure.

3. A magnetic disk drive including at least one magnetic head assembly that has an air bearing surface (ABS) and that includes a write head and a read head, comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a spin valve sensor;
nonmagnetic electrically nonconductive first and second read gap layers;
the spin valve sensor being located between the first and second read gap layers;
a ferromagnetic first shield layer; and
the first and second read gap layers being located between the first shield layer and the first pole piece layer; and
the spin valve sensor including:
a ferromagnetic free layer structure;
first and second antiparallel (AP) pinned layer structures;
the first AP pinned layer structure having a first antiparallel (AP) coupling layer located between ferromagnetic first and second antiparallel (AP) pinned layers and the second AP pinned layer structure having a second antiparallel (AP) coupling layer located between ferromagnetic third and fourth antiparallel (AP) pinned layers;
the second and third AP pinned layers having magnetic moments that are perpendicular to the ABS and parallel with respect to one another;
a nonmagnetic electrically conductive first spacer layer located between the free layer structure and the second AP pinned layer and interfacing the second AP pinned layer;
a nonmagnetic electrically conductive second spacer layer located between the free layer structure and the third AP pinned layer and interfacing the third AP pinned layer; and
the first and third AP pinned layers having magnetic thicknesses that are greater or less than magnetic thicknesses of the second and fourth AP pinned layers respectively;
each of the second and third AP pinned layers exerting a ferromagnetic coupling field on the free layer structure; and
the first and second AP pinned layer structures having a net demagnetizing field that counterbalances the ferromagnetic coupling fields on the free layer structure;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

4. A method of making a magnetic read head which has an air bearing surface (ABS), comprising the steps of:
forming nonmagnetic electrically nonconductive first and second read gap layers;
forming a spin valve sensor between the first and second read gap layers;
forming ferromagnetic first and second shield layers; and
forming the first and second read gap layers between the first and second shield layers;
making the spin valve sensor comprising the steps of:
forming a ferromagnetic free layer structure;
forming first and second antiparallel (AP) pinned layer structures wherein the first AP pinned layer structure has a first antiparallel (AP) coupling layer located between ferromagnetic first and second antiparallel (AP) pinned layers and the second AP pinned layer structure has a second antiparallel (AP) coupling layer located between ferromagnetic third and fourth antiparallel (AP) pinned layers;
forming the second and third AP pinned layers with magnetic moments that are perpendicular to the ABS and parallel with respect to one another;
forming a nonmagnetic electrically conductive first spacer layer between the free layer structure and the second AP pinned layer and interfacing the second AP pinned layer;

forming a nonmagnetic electrically conductive second spacer layer between the free layer structure and the third AP pinned layer and interfacing the third AP pinned layer; and forming the first and third AP pinned layers with magnetic thicknesses that are greater or less than magnetic thicknesses of the second and fourth AP pinned layers respectively;

the forming of the second and third AP pinned layers causing each of the second and third AP pinned layers to exert a ferromagnetic coupling field on the free layer structure; and forming the first and second AP pinned layer structures with a net demagnetizing field that counterbalances the ferromagnetic coupling fields on the free layer structure.

5. A method of making magnetic head assembly that has an air bearing surface (ABS), comprising the steps of:

making a write head including the steps of:
forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:
forming nonmagnetic electrically nonconductive first and second read gap layers;

forming a spin valve sensor between the first and second read gap layers;

forming the first and second read gap layers between the first shield layer and the first pole piece layer; and a making of the spin valve sensor comprising the steps of:
forming a ferromagnetic free layer structure;

forming first and second antiparallel (AP) pinned layer structures wherein the first AP pinned layer structure has a first antiparallel (AP) coupling layer located between ferromagnetic first and second antiparallel (AP) pinned layers and the second AP pinned layer structure has a second antiparallel (AP) coupling layer located between ferromagnetic third and fourth antiparallel (AP) pinned layers;

forming the second and third AP pinned layers with magnetic moments that are perpendicular to the ABS and parallel with respect to one another;

forming a nonmagnetic electrically conductive first spacer layer between the free layer structure and the second AP pinned layer and interfacing the second AP pinned layer;

forming a nonmagnetic electrically conductive second spacer layer between the free layer structure and the third AP pinned layer and interfacing the third AP pinned layer; and forming the first and third AP pinned layers with magnetic thicknesses that are greater or less than magnetic thicknesses of the second and fourth AP pinned layers respectively;

the forming of the second and third AP pinned layers causing each of the second and third AP pinned layers to exert a ferromagnetic coupling field on the free layer structure; and forming the first and second AP pinned layer structures with a net demagnetizing field that counterbalances the ferromagnetic coupling fields on the free layer structure.

* * * * *